Oct. 20, 1964   F. L. TORNEY, JR   3,153,744
IONIZATION MANOMETER FOR MEASURING VERY LOW PRESSURE
Filed June 18, 1962
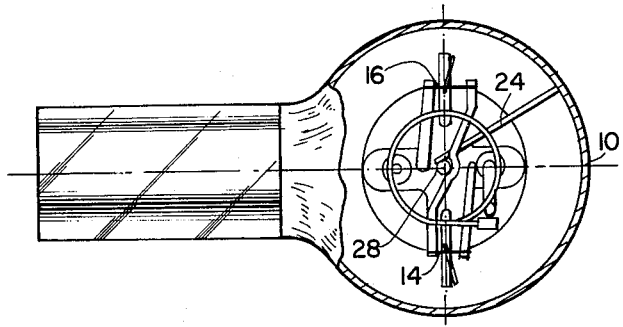
FIG. 2
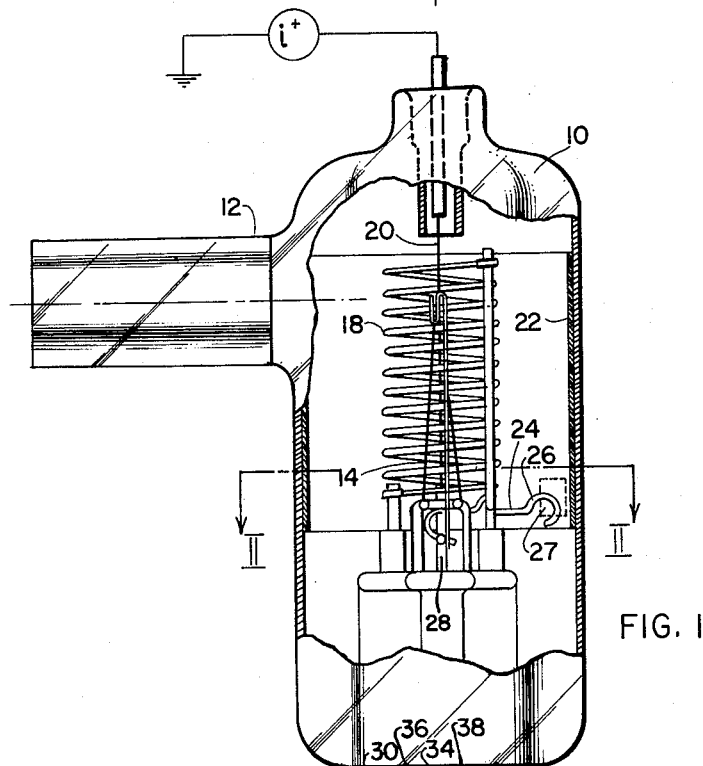
FIG. 1
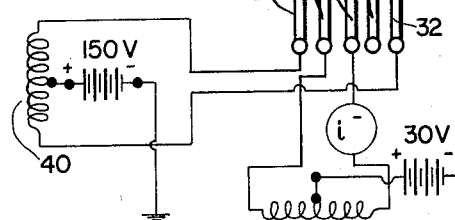
INVENTOR.
FRANKLIN L. TORNEY JR.
BY

United States Patent Office

3,153,744
Patented Oct. 20, 1964

3,153,744
IONIZATION MANOMETER FOR MEASURING
VERY LOW PRESSURE
Franklin L. Torney, Jr., South Weymouth, Mass., assignor, by mesne assignments, to National Research Corporation, a corporation of Massachusetts
Filed June 18, 1962, Ser. No. 203,335
7 Claims. (Cl. 315—111)

This invention relates to vacuum gauges of the ionization type and more particularly to the Bayard-Alpert type of ionization gauge.

The Bayard-Alpert gauge (see Bayard and Alpert, Review of Scientific Instruments, 21: 571 (1950)), offered a lower pressure range than existing gauges by its provision of an ion collector of small cross-section surrounded by an electron collector grid. However, operation at very high and ultra high vacuum has presented new problems in sensitivity and stability. These problems include significant outgassing of the gauge elements, vulnerability to leakage at lead-ins and floating envelope potentials due to random collection of charged particles. The manufacturing and operating expedients necessary to compensate for these difficulties present further problems. Screen grids and envelope coatings for suppressing random charged particles require an extra lead-in with consequent leakage problems.

It is therefore a principal object of this invention to provide an improved construction of a Bayard-Alpert ionization gauge which will minimize these difficulties.

It is a further object of this invention that the improved gauge shall have a simple construction, offer foolproof usage and be reliable and inexpensive to manufacture.

Other objects of the invention will in part appear hereinafter and will in part be obvious.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein:

FIG. 1 is a sectional view of a Bayard-Alpert gauge made in accordance with the present invention.

FIG. 2 is a cross-section viewed as indicated by the arrows II—II in FIG. 1.

Referring now to FIG. 1, there is shown an envelope 10, with tubulation 12, housing the gauge elements. The basic elements of the gauge are two filaments 14 and 16 (see FIG. 2 for the latter), an electron collector grid 18, and an ion collector wire 20. In operation one of the filaments is heated to thermionically emit electrons. The electrons are accelerated by the positively charged grid 18. A large percentage of the electrons temporarily avoid capture by the grid and are temporarily trapped inside the grid where many of them ionize gas molecules by collision. Among the products of these collisions are positive ions. The positive ions thus formed are accelerated to the ion collector 20 which is biased negative with respect to all other elements. A platinum coating, indicated at 22, is deposited on the inside of the envelope. This coating is connected to the cathode lead-in prong 34 via a connector 24. Thus the coating is biased at cathode potential and tends to repel random ion and electron migration to the envelope.

The connector 24 terminates in a spring loop 26 which bears against the coating to insure a good contact free of arcing which would damage the envelope. The use of a connector inside the tube eliminates the need for a lead-in through the glass. The lead-in is welded to the tube elements at 28, as indicated in FIG. 2.

The prongs of FIG. 1 are in a straight line, thus providing a simple arrangement for connection to the gauge control. The two outside prongs 30 and 32 are connected to the accelerating grid, the center prong 34 to both filaments and the remaining prongs 36 and 38 to filaments 16 and 14, respectively. This symmetrical arrangement makes the gauge foolproof. The gauge can be plugged into an appropriate socket, as indicated schematically at the bottom of FIG. 1. Only one of the filaments is connected to the heating circuitry. The other is held in reserve in case of burnout or other malfunction of the first filament. The gauge is simply turned around and the reserve filament is connected and the first filament disconnected. There is no complication in locating the tube prongs. The person using the gauge can insert the leads into the sockets in either permissible mode and the gauge will operate. This also permits a more selective pointing of the tubulation and location of the socket. Where clips are used to hook up the leads, the simple symmetrical arrangement reduces the possibility of human error. Each grid wire goes to either of the two outer leads, the filament wires to the center lead and to the remaining lead. The connector for the coating 22 is connected to the center lead so that any of the above selected arrangements assures that the screen will be properly connected to the circuit. These considerations also apply to the use of lead wires where no standard socket is used.

A small patch of silver 27 is located under the platinum film at the location of the connector. If the connector scrapes off some of the platinum, the silver remains adherent to the glass and continues to conduct electricity from the connector to the coating.

In a preferred embodiment, the grid and filament are both made of tungsten.

A Bayard-Alpert gauge must be degassed before use and whenever the gas in the tube rises above the amount of gas produced by the system. In the present invention this is accomplished by firing the grid at approximately 950° C. by a 5 volt, 7.6 amp alternating current. The secondary of the outgas transformer is indicated at 40. The grid heats the collector and filaments by radiation. Additionally, the grid and filaments are preheated for a few minutes at 1300° C. before assembly with the envelope. The grid is made of tungsten which requires annealing in a hydrogen atmosphere as a fabrication step. Large amounts of hydrogen are sorbed in the annealing. Most of this is liberated during the intense preheating and any remaining hydrogen can be handled by the pumping ability of the gauge system during the outgassing steps. The degassing also entails baking the envelope. Since the electrode 22 is in the form of a coating, it is also heated by this baking of the envelope.

The circuitry for the gauge is shown in FIG. 1. The operating filament is maintained at 30 volts and the accelerating grid at 150 volts. This provides a 120 volt electron accelerating potential which affords peak ionization efficiency at the pressure ranges encountered in operation. Since the filament is at 30 volts, the coating will be at 30 volts. The use of these high positive voltages permits the ion collector 20 to be grounded rather than maintained at a negative potential. This simplifies control and allows greater interchangeability between gauge tubes and electrometer circuits.

Since certain changes may be made in the above apparatus without departing from the scope of the invention herein involved, it is intended that all matter contained in the above description shall be interpreted as illustrative and not in a limiting sense.

What is claimed is:

1. An ionization-type, vacuum gauge comprising an envelope with a gas port, said envelope having therein an ion collector comprising a conductor of very small cross-section, an electron collector electrode surrounding said ion collector and a cathode electrode external to said electron collector electrode, at least one of said electrodes having a fixed positive bias with respect to said ion collector, a screen electrode between said cathode and envelope and a connector disposed wholly within said envelope for electrically linking said screen electrode and one of the said electrodes.

2. The gauge of claim 1 wherein the said electrode which is electrically linked to the screen grid is the said cathode.

3. The gauge of claim 1 wherein two cathodes, each having two terminals, are provided, a single tube prong being connected to one of the terminals of each of said cathodes and to said connector whereby the two cathodes and the screen are all in parallel circuit arrangement.

4. An ionization type vacuum gauge having an ion collector comprising a conductor of very small cross-section, an electron collector electrode surrounding said ion collector and two cathodes external to the electron collector electrode, an end plate for supporting lead-in prongs, a first prong connected to one terminal of each of said cathodes in parallel, a second prong connected to the other terminal of one of said cathodes and a third prong connected to the other terminal of the other cathode, said second and third prongs being symmetrically arranged with respect to said first prong on said end plate, and further including in combination therewith an envelope, surrounding said components and having a gas port, to thereby define a sensing head.

5. An ionization type vacuum gauge comprising an envelope with a gas port, said envelope having therein an ion collector comprising a conductor of very small cross-section, an electron collector electrode surrounding said ion collector and a cathode external to the electron collector electrode, a metallic coating on the interior portion of the envelope surrounding said components, an electrical connector within said envelope extending from the cathode to the coating.

6. In an ionization type vacuum gauge comprising a glass envelope with a gas port, said envelope having a cathode electrode, electron collector electrode and ion collector therein, a first conductive coating on the interior of said envelope surrounding the cathode and collectors for stabilizing electrostatic charge at the envelope, a fixed positive bias relative to said ion collector, the improvement comprising an electrical connector fixed to one of said electrodes, said connector extending to the coated portion of the envelope and making bearing contact therewith, the connector being spring loaded against the envelope, and a second conductive coating comprising a patch of silver on the glass envelope interior located at the point of contact of the connector to insure good electrical contact between the connector and coating.

7. In the combination of (*a*) means defining an evacuated space and (*b*) an ionization type vacuum gauge for measuring residual gas pressure in said space, said gauge having an ion collector of very small cross-section located within said space, an electron collector electrode located within said space and surrounding said ion collector, and two cathodes located in said space externally of the electron collector electrode, a gauge end plate for supporting lead-in prongs, a first prong connected to one terminal of each of said cathodes in parallel, a second prong connected to the other terminal of one of said cathodes and a third prong connected to the other terminal of the other cathode, said second and third prongs being symmetrically arranged with respect to said first prong on said end plate.

References Cited in the file of this patent

UNITED STATES PATENTS 2,582,647     Morgan  ---------------- Jan. 15, 1952
2,605,431     Bayard  ---------------- July 29, 1952

OTHER REFERENCES

Walter H. Kohl: Materials Technology for Electron Tubes, Reinhold Publishing Co., N.Y.C., 1951, pp. 177, 183, 184 relied upon.